(12) United States Patent
Tonami

(10) Patent No.: US 7,815,052 B2
(45) Date of Patent: Oct. 19, 2010

(54) PAPER CLIP REMOVING DEVICE AND DOCUMENT READING APPARATUS

(75) Inventor: Kazumasa Tonami, Yamato-Koriyama (JP)

(73) Assignee: Sharp Kabushiki Kaisha, Osaka (JP)

(*) Notice: Subject to any disclaimer, the term of this patent is extended or adjusted under 35 U.S.C. 154(b) by 317 days.

(21) Appl. No.: 12/060,364

(22) Filed: Apr. 1, 2008

(65) Prior Publication Data

US 2008/0246291 A1 Oct. 9, 2008

(30) Foreign Application Priority Data

Apr. 4, 2007 (JP) ............................. 2007-098393

(51) Int. Cl.
B25C 11/00 (2006.01)
(52) U.S. Cl. ...................... 209/11; 270/58.33; 254/28
(58) Field of Classification Search ............... 270/58.07, 270/58.33; 254/28; 209/636; 294/65.5; 219/216
See application file for complete search history.

(56) References Cited

U.S. PATENT DOCUMENTS 6,886,824 B2 * 5/2005 Johdai et al. ............. 270/58.33

2003/0067107 A1 * 4/2003 Ikeda ....................... 270/58.33

FOREIGN PATENT DOCUMENTS

| JP | 62-11673 | | | 1/1987 |
|---|---|---|---|---|
| JP | 2000131894 | A | * | 5/2000 |
| JP | 2000159449 | A | * | 6/2000 |
| JP | 2001-063910 | | | 3/2001 |
| JP | 2002362754 | A | * | 12/2002 |

* cited by examiner

*Primary Examiner*—Joseph C Rodriguez
(74) *Attorney, Agent, or Firm*—Renner, Otto, Boisselle & Sklar, LLP

(57) ABSTRACT

A paper clip removing device capable of removing a paper clip made of a shape memory alloy, that has such a shape that a plurality of documents are bound at a normal temperature and a document bundle is released in a heated state, when the paper clip is on any positions on an end side of a document is provided. When a paper clip made of a shape memory alloy, that has such a shape that a plurality of documents are bound at a normal temperature and a document bundle is released in a heated state, is removed, the paper clip removing device detects a position of the paper clip to heat the paper clip and deforms the paper clip into a shape of releasing a document bundle to attract and remove the paper clip, resulting that the paper clip is collected in the collecting box.

6 Claims, 9 Drawing Sheets

INITIAL POSITION

PAPER CLIP DETECTION

PAPER CLIP HEATING

PAPER CLIP ATTRACTION

PAPER CLIP COLLECTION

RETURNING TO INITIAL POSITION

PAPER CLIP REMOVING DEVICE AND DOCUMENT READING APPARATUS

CROSS-NOTING PARAGRAPH

This Nonprovisional application claims priority under 35 U.S.C. §119(a) on Patent Application No. 2007-098393 filed in JAPAN on Apr. 4, 2007, the entire contents of which are hereby incorporated herein by references.

FIELD OF THE INVENTION

The present invention relates to a paper clip removing device and a document reading apparatus provided with the paper clip removing device, and, in particular, to a paper clip removing device for removing a paper clip made of a shape memory alloy, that has such a shape that a plurality of documents are bound at a normal temperature and a document bundle is released in a heated state, and a document reading apparatus provided with the paper clip removing device.

BACKGROUND OF THE INVENTION

Conventionally, a document bundle has been bound such that both end portions of a staple are penetrated through the document bundle and then clinched inside.

When the document bundle that is bound by the staple is copied, the staple needs to be manually removed in each case, which is troublesome, and especially when there are a lot of bound document bundles, there is a disadvantage that the working efficiency is extremely reduced.

To solve such a disadvantage, an automatic document feeder disclosed in Japanese Laid-Open Patent Publication No. 2001-63910 is configured so that either one of modes can be selectively performed of a first mode in which a staple is removed from a document bundle and subsequently each of the separated document is transported one by one, a second mode in which only an operation of removing a staple from a document bundle is performed and a third mode in which each document is transported one by one from a document bundle. Thereby, the automatic document feeder can be used as a dedicated binding member removing device.

Further, in a paper clip for paper sheets disclosed in Japanese Unexamined Utility Model Application Publication No. 62-11673, the paper clip made of a shape memory alloy is heated to be removed so that paper sheets from which the paper clip is removed are copied.

Generally, paper clips are fitted on various positions, however, in the above-mentioned conventional techniques, a paper clip that is bound at the almost specified position is subject to the removal, resulting that it is impossible to remove paper clips on various positions.

SUMMARY OF THE INVENTION

The present invention is made in view of the foregoing circumstances, and an object is to provide a paper clip removing device in which a paper clip made of a shape memory alloy, that has such a shape that a plurality of documents are bound at a normal temperature and a document bundle is released in a heated state, can be removed when the paper clip is fitted on any positions on one side of the document, and a document reading apparatus provided with the paper clip removing device.

To solve the above-mentioned disadvantage, the paper clip removing device according to the present invention is constituted as follows.

The paper clip removing device for removing a paper clip made of a shape memory alloy, that has such a shape that a plurality of documents are bound at a normal temperature and a document bundle is released in a heated state, includes a detecting device that detects a position of the paper clip; a heating device that heats the paper clip; an attracting device that attracts the paper clip by a magnetic force; a moving device that moves the detecting device, the heating device, and the attracting device; and a controlling device that controls an operation of the moving device, wherein the controlling device controls the moving device so that the paper clip is heated based on the information of the position of the paper clip detected by the detecting device and the paper clip that has been deformed into a shape of releasing the document bundle is attracted by the attracting device to be removed.

The detecting device, the heating device and the attracting device are constituted integrally as a paper clip removing device, and further the paper clip is constituted so as to have a paper clip that is made of a shape memory alloy and an attracting portion that is made of a magnetic substance, and therefore the paper clip removing device is easily moved by the moving device and the paper clip is easily detected, removed and collected.

The paper clip removing device is constituted to further include a collecting box in which the paper clip is collected and a cooling device that cools down the paper clip collected in the collecting box, so that the paper clip is collected and cooled down to restore the paper clip to the original shape.

The paper clip removing device is constituted to further include a temperature detecting device that detects a temperature in the collecting box, wherein the controlling device performs a notification depending on the temperature in the collecting box so as to notify a user that the heated paper clip is in the collecting box.

Further, in a case of a document reading apparatus provided with such a paper clip removing device, the controlling device performs the control so that the presence of a paper clip on a leading end of a document placed on a document stacker is detected when an instruction to start a document reading is made, and the paper clip is removed by the paper clip removing device to start a document transport in a state where the document has been made unbound, resulting that it is possible to eliminate the troublesomeness of removing the paper clip.

PREFERRED EMBODIMENTS OF THE INVENTION

Now referring to the accompanying drawings, preferred embodiments of a paper clip removing device and a document reading apparatus according to the present invention will be described below.

A schematic of the document reading apparatus provided with the paper clip removing device according to the present invention will first be described.

Figure 1:
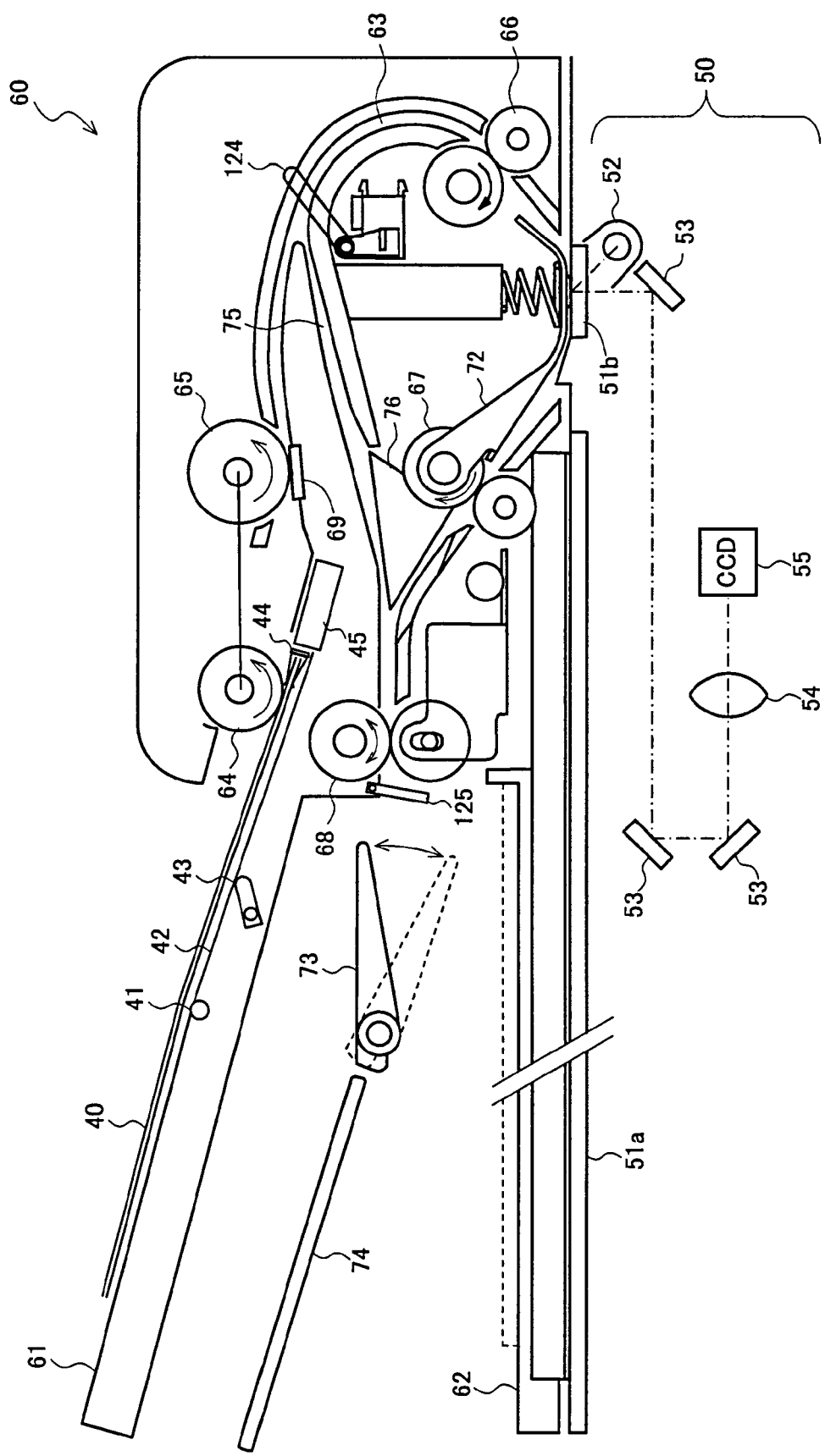
FIG. 1 is a diagram for illustrating a structural example of a document reading apparatus according to the present invention.

FIG. 1 is a diagram for illustrating a structural example of a document reading apparatus according to the present invention. In this figure, the image reading device includes a document platen 51 (51a and 51b) composed of platen glass. An automatic document feeder 60 is disposed on the upper side of the document platen 51, and a scanner optical system 50 is disposed on the lower side of the document platen 51.

The scanner optical system 50 includes a light source 52 that irradiates a light for a recording paper (hereinafter referred simply as a document) 40 on which a document image is formed, a CCD 55 as a photoelectric conversion element, a plurality of mirrors 53 that conduct the reflected light from the document 40 to the CCD 55, and a through lens 54 that images the reflected light from the document 40 on the CCD 55.

The automatic document feeder 60 is constituted so as to function as a document cover for covering and uncovering the document platen 51, and includes a document tray 61 on which the document 40 is placed and a paper discharge tray 62 that stores the document 40 discharged after a reading process.

A document transport path 63 is formed where the document 40 fed from the document tray 61 is discharged to the paper discharge tray 62 via a document reading position. The document transport path 63 is disposed with rollers including a pick-up roller 64, a separation roller 65, a resist roller 66, a transport roller 67, and a paper discharge roller 68, in order from its upstream side (the side of the document tray 61). Note that, the document reading position is a position that is faced to the document platen 51b in the document transport path 63, and a position where an image of the document 40 is read by the above-mentioned scanner optical system 50.

A separation plate 69 is arranged at a position that is faced to the separation roller 65 across the document transport path 63.

Further, a paper feed sensor 124 that detects the paper feed state of the document 40, is disposed between the separation roller 65 and the resist roller 66 in the document transport path 63. Furthermore, a document pressing plate 72 that presses the document 40 subject to the reading processing to a direction of the document platen 51b, is arranged on the opposite side of the document platen 51b across the document transport path 63.

In addition, a pivot plate for an intermediate tray (switching gate) 73 that guides the discharged document selectively either to an intermediate tray 74 or to the paper discharge tray 62, is arranged near the paper discharge roller 68.

Now, the feed state of the document in the automatic document feeder 60 will be described.

The document 40 that is placed on the document tray 61 is taken out from the document tray 61 by the pick-up roller 64, and fed to the document transport path 63 one by one so as to avoid an overlapping feeding by the separation roller 65 and the separation plate 69 that are arranged on an downstream side of the pick-up roller 64.

A leading end and a trailing end of the document 40 that is transported on the document transport path 63, are detected by the paper feed sensor 124. Then, the transport of the document 40 is temporarily stopped in a state where the leading end of the document 40 is brought into contact with the resist roller 66. In this way, the document 40 is kept stand-by at the arrangement position of the resist roller 66 so as to adjust a timing when the document 40 is led to the document reading position.

When the timing that the document 40 is led to the document reading position is reached, the resist roller 66 is driven and the document 40 is transported toward the document reading position while preventing a skew feeding, etc. Then image data is read by the scanner optical system 50, while the document 40 is being applied with a force to a direction of the document platen 51b by the document pressing plate 72.

When an image only on one side of the document 40 is read (e.g., one-side image forming processing), the switching gate 73 is set at a position represented by solid line. In this case, the document transport path 63 is set in the direction of the paper discharge tray 62. The document 40 whose document image has been read at the document reading position is transported by the transport roller 67 and the paper discharge roller 68 to be discharged on the paper discharge tray 62. A paper discharge sensor 125 that detects the discharged document 40 is disposed behind the paper discharge roller 68.

Further, when images on both sides of the document 40 are read (e.g., both-side image forming processing), the switching gate 73 is switched so as to be placed at a position represented by dotted line in FIG. 1. When the document image on one side is first read at the document reading position, the document 40 is discharged by the transport roller 67 and the paper discharge roller 68 to be led to the intermediate tray 74 by the switching gate 73.

Then, the paper discharge roller 68 is stopped and reversely rotated in a state where the trailing end of the document 40 is sandwiched by the paper discharge roller 68 so that the document 40 is reversely transported, led to the side of a paper re-feed transport path 75 at a bifurcation 76, and fed on the document transport path 63 on which the paper feed sensor 124 is disposed. Subsequently, in a same manner as when feeding from the document tray 61, the document 40 is transported by the resist roller 66 again and the document image on back side is read at the document reading position.

In this way, the document 40 whose images on both sides have been read is discharged by the transport roller 67 and the paper discharge roller 68. At this time, the switching gate 73 is switched again so as to be placed in a position represented by solid line in FIG. 1, and the document 40 whose images on both sides have been read out is discharged on the paper discharge tray 62.

The vicinity of the document tray 61 provided with paper clip removing device 45 will be described in detail below.

A side of the leading end of the document 40 placed on the document tray 61 in the transport direction is bound by a paper clip 44. The document 40 is placed on a position where a document lifting-lowering plate 42 is lowered. In this state, the leading end of the document in the transport direction is at a position close to the paper clip removing device 45, which will be described later. The document lifting-lowering plate 42 is rotatable around a support shaft 41 and is lifted and lowered varying an angle of a document lifting-lowering mechanism (lifting-lowering lever) 43 by a driving mechanism such as a motor, which is not shown.

The automatic document feeder 60 is in the position where the document lifting-lowering plate 42 is lowered in an non-operational state, and operates the document lifting-lowering mechanism 43 to lift the document 40 when an instruction to read the document is given by a user, then the uppermost document 40 is picked up by the pick-up roller 64 to perform a feeding.

In the present invention, before starting the document transport, the document 40 is lifted by the document lifting-lowering mechanism 43 to perform a processing of removing the paper clip 44.

Figure 2:
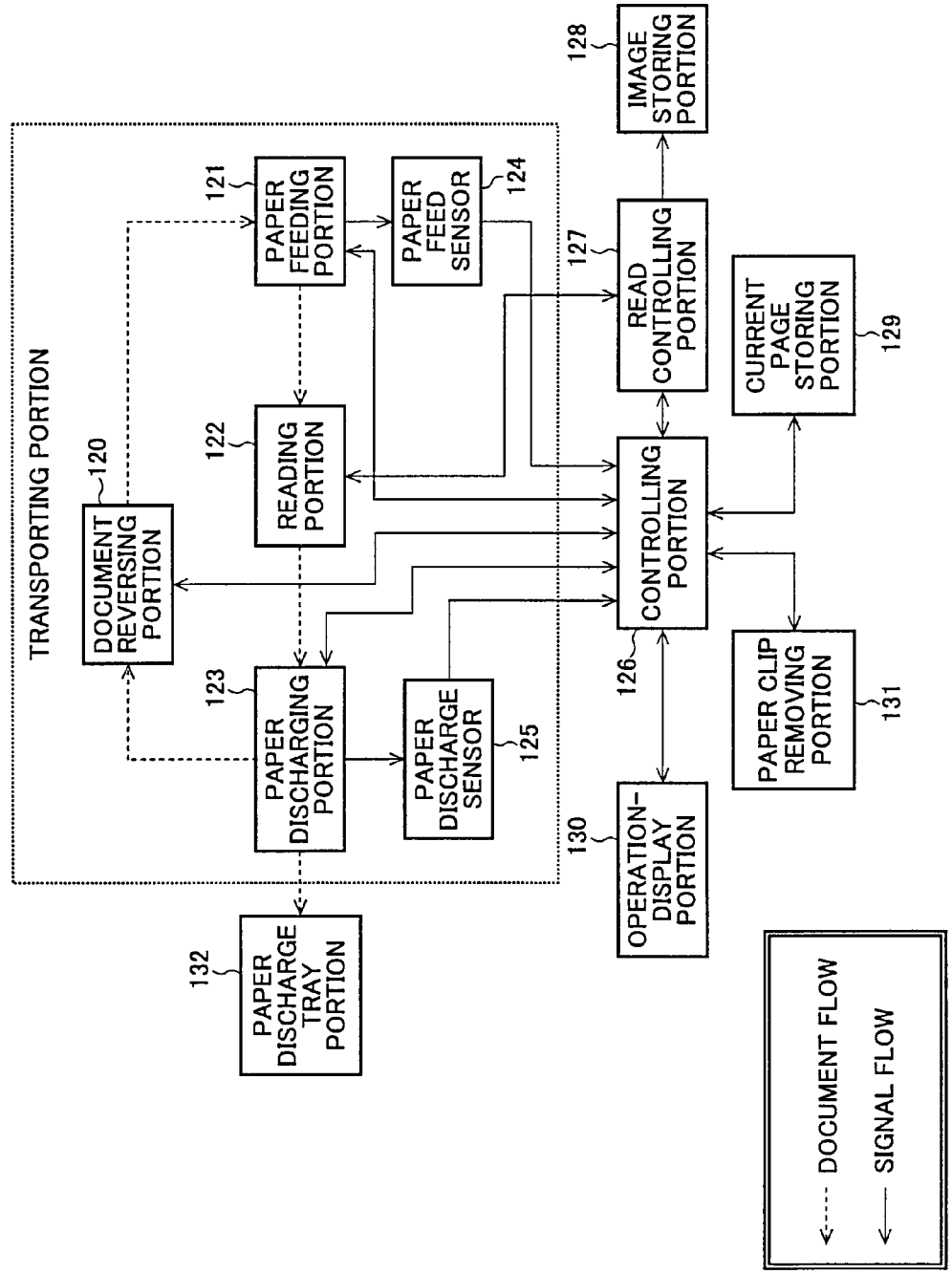
FIG. 2 is a block diagram for illustrating an embodiment of a document reading apparatus according to the present invention.

FIG. 2 is a block diagram for illustrating an embodiment of the document reading apparatus according to the present invention.

The document reading apparatus includes a paper feeding portion 121 that feeds the document 40, a reading portion 122 that reads an image of the document 40, a paper discharging portion 123 that discharges the document 40 whose image has been read, a paper discharge tray portion 132 that stores the discharged document, and a document reversing portion 120 that reverses the document 40 to re-feed when reading both-side images.

The above-mentioned paper feeding portion 121 to paper discharging portion 123 are collectively refereed as a transporting portion. In the transporting portion, the paper feeding portion 121 and the paper discharging portion 123 are provided with the above-mentioned sensors for detecting documents (the paper feed sensor 124 and the paper discharge sensor 125), respectively. These sensors for detecting documents enable to detect a jam of the document 40.

As the configuration with respect to a control, a controlling portion 126 that controls the transport mechanism (the paper feeding portion 121 and paper discharging portion 123) of the transporting portion, the paper feed sensor 124 and the paper discharge sensor 125, a read controlling portion 127 that controls the reading portion 122, an image storing portion 128 that stores a read image, a current page storing portion 129 that stores a current read page, and an operation-display portion 130 on which an operation is performed by a user. The operation-display portion 130 can be configured by a liquid crystal display device and a touch panel The operation-display portion 130 can be configured so as to be separated into a displaying portion having a display screen, and an operating portion including such as keys and buttons that allow a user to perform an input operation.

Note that, the read controlling portion 127 controls reading operations by the reading portion 122 included in the transporting portion as well as by the document reading apparatus including the scanner optical system 50.

The paper feed sensor 124 and the paper discharge sensor 125 are provided so as to detect a position of the document 40 on the document transport path 63, and to pointout a jam occurrence location. When the document 40 is remained on the document transport path 63 in the event of a jam, these paper feed sensor 124 and the paper discharge sensor 125 inform the controlling portion 126 of a jam detection signal indicative of the state.

Figure 3:
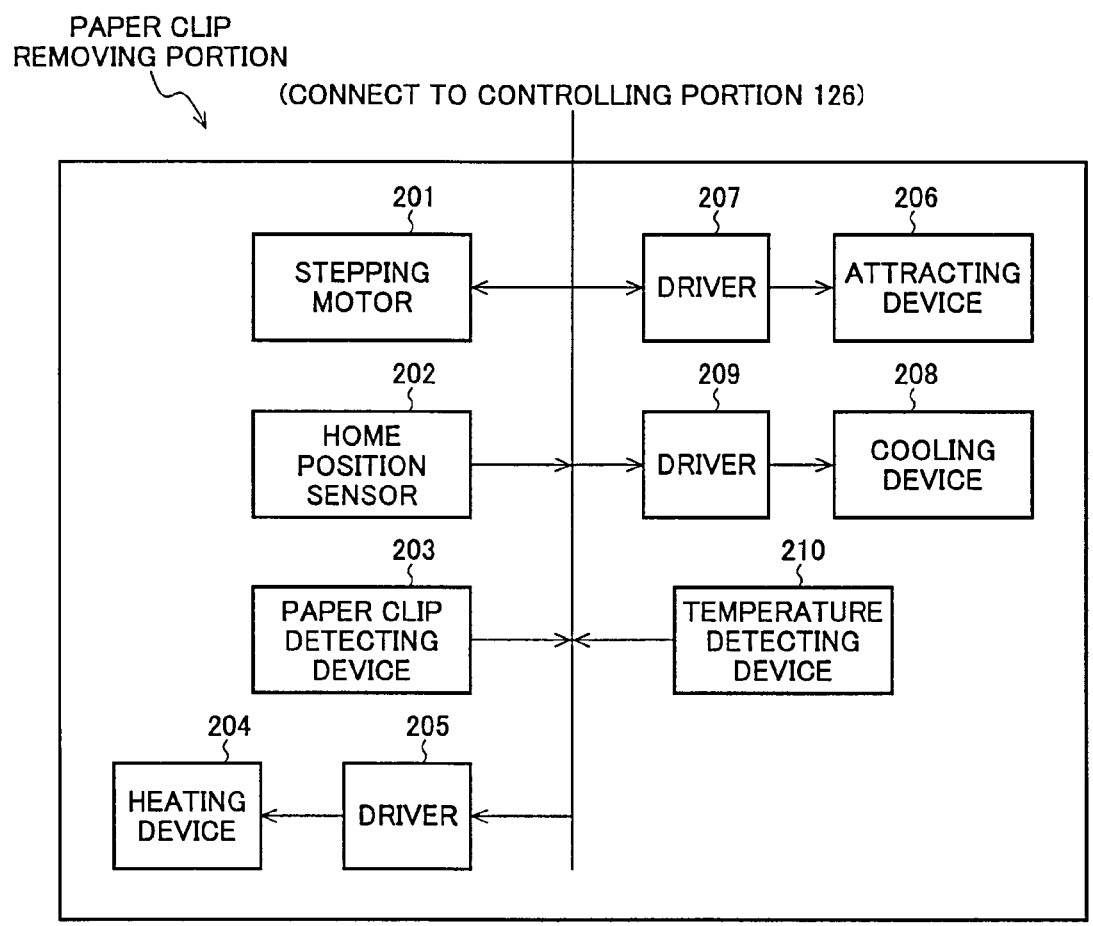
FIG. 3 is a block diagram for showing a paper clip removing portion in detail.

A paper clip removing portion (paper clip removing device) 131 serving as a characteristic part of the present invention is connected to the controlling portion 126 to be controlled by the controlling portion 126. FIG. 3 is a block diagram for showing the paper clip removing portion 131 in detail. In this figure, the paper clip removing portion 131 is composed of a stepping motor 201, a home position sensor 202, a paper clip detecting device (metal detection sensor) 203, a heating device 204, a temperature detecting device 210, a cooling device 208, and an attracting device 206. Loads of the heating device 204, the attracting device 206, and the cooling device, etc., are connected via drivers 205, 207 and 209, and the respective drivers 205, 207 and 209 receive control signals of the controlling portion 126 to supply predetermined driving currents to the respective loads.

The stepping motor 201, the home position sensor 202, the paper clip detecting device 203, the heating device 204, the temperature detecting device 210, the cooling device 208, and the attracting device 206 will be described later.

Figure 4:
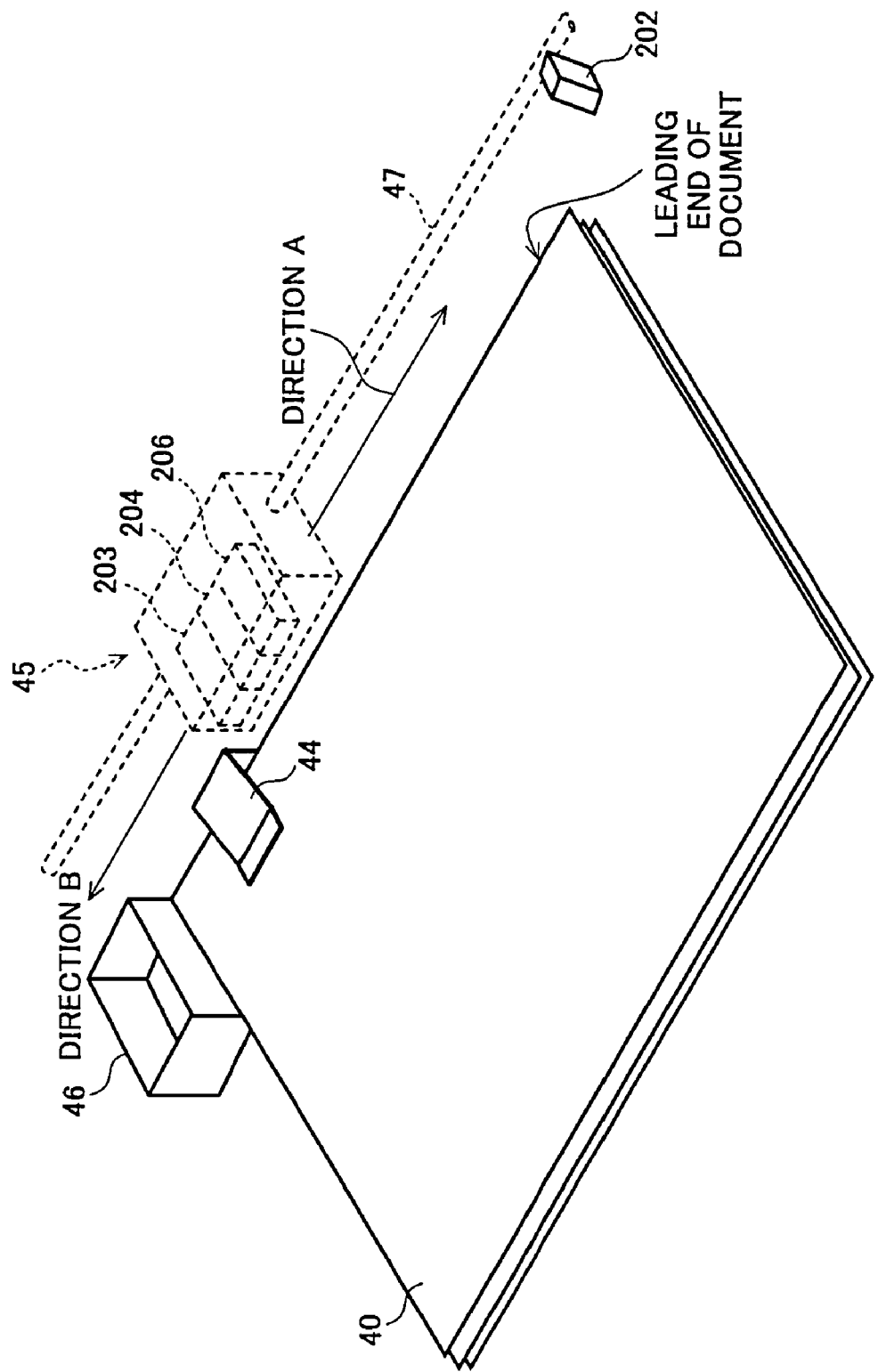
FIG. 4 is a diagram for showing a schematic of paper clip removing device.

FIG. 4 is a diagram for showing a schematic of the paper clip removing device 45. In this figure, the paper clip removing device 45 includes the paper clip detecting device 203, the heating device 204, and the attracting device 206.

The paper clip detecting device 203 is composed of the metal detection sensor and detects a position of the paper clip 44.

The heating device 204 is composed of a heater, and heats and deforms the paper clip 44 at the position of the detected paper clip 44 to remove the paper clip from the document 40.

The attracting device 206 is composed of an electromagnet, and attracts the heated and deformed paper clip 44 by a magnetic force to collect the paper clip 44.

A shaft 47 penetrates through the paper clip removing device 45, and is movably arranged in parallel with the leading end of the document 40 (directions A and B) along the shaft 47 by a moving mechanism of the paper clip removing device.

The paper clip detecting device 203 has a pair of detection terminals made of metal (detection terminals 203a and 203b in FIG. 5), and the detection terminals move closer to the paper clip 44 to detect the paper clip 44. Examples of the detecting method include a method in which a detection is performed such that the detection terminals are connected to an oscillator and a change in electrostatic capacity between the detection terminals is converted to a change of frequency, and a method in which a detection is performed according to presence or absence of electrical continuity between the detection terminals by bringing the terminals into contact with the paper clip 44 directly.

Figure 5:
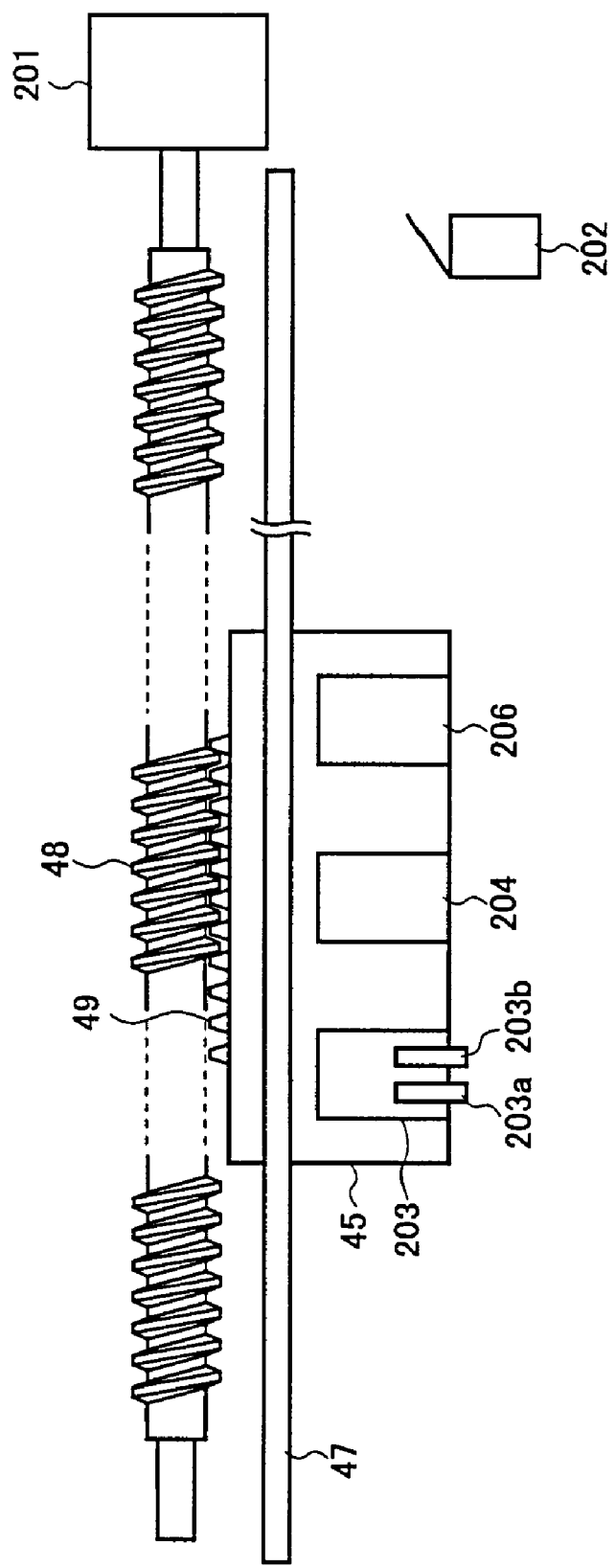
FIG. 5 is a diagram for showing a moving mechanism of the paper clip removing device in detail.

FIG. 5 is a diagram for showing the moving mechanism of the paper clip removing device in detail. The moving mechanism of the paper clip removing device is composed of a combination of a worm gear 48 and a rack gear 49, and the worm gear 48 is arranged so that its long side direction is in parallel with the shaft 47. The worm gear 48 has one end provided with the stepping motor 201 to turn the worm gear 48.

The home position sensor 202 detects a home position of the paper clip removing device 45 by the contact of the paper clip removing device 45.

In this way, in the moving mechanism of the paper clip removing device, the paper clip detecting device 203, the heating device 204, and the attracting device 206 are integrally constituted as the paper clip removing device 45, and moving device composed of the shaft 47, the stepping motor 201, the rack gear 49, and the worm gear 48 moves the paper clip removing device 45.

Figure 6A:
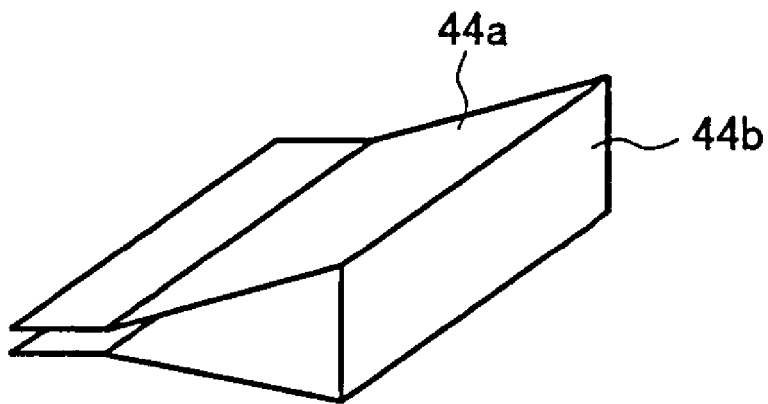
FIGS. 6A and 6B are diagrams for showing paper clips in detail.
Figure 6B:
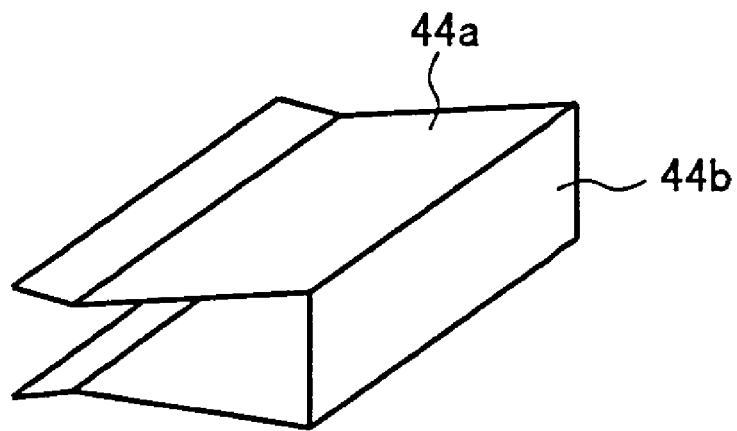

FIGS. 6A and 6B are diagrams for showing in detail the paper clip 44 made of a shape memory alloy, that has such a shape that a plurality of documents are bound at a normal temperature and a document bundle is released in a heated state. In these figures, the paper clip 44 is composed of a combination of the binding portion 44a made of the shape memory alloy and the attracting portion 44b made of a magnetic substance, and heats the heating device 204 to deform the binding portion 44a, so that the state of the document 40 is shifted from the bound state to the released state. The attracting portion 44b, that is made of a magnetic substance such as iron, can be attracted by the energized attracting device 206 to be moved by the paper clip removing device 45.

For example, FIG. 6A shows the paper clip 44 in a bound state at a normal temperature, and FIG. 6B shows the paper clip 44 in an opened state by being heated by the heating device 204.

FIGS. 7A to 7F are diagrams for illustrating a movement of the paper clip removing device 45.

Figure 7A:
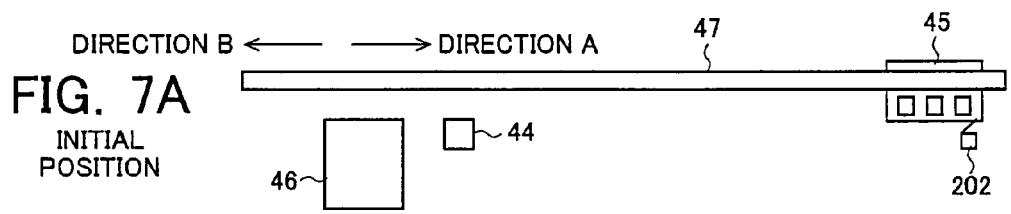
FIGS. 7A to 7F are diagrams for illustrating a movement of the paper clip removing device, respectively.
Figure 7B:
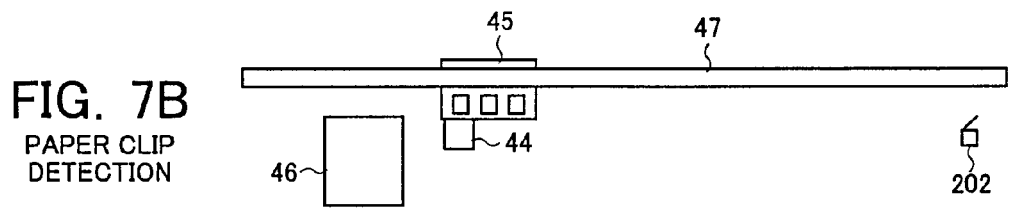

FIG. 7A shows a state where the paper clip removing device 45 is located at an initial position (home position). The paper clip removing device 45 is moved in the direction B (a direction away from the home position) to the position where the paper clip 44 is detected (FIG. 7B).

Figure 7C:
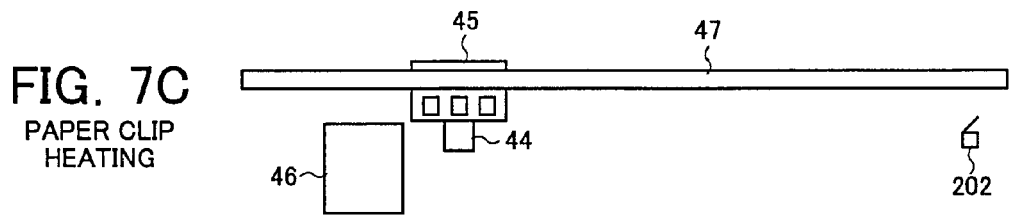

When the paper clip detecting device 203 detects the paper clip 44, the paper clip removing device 45 is moved by a predetermined distance (a distance between the paper clip detecting device 203 and the heating device 204) so that the heating device 204 is energized and the paper clip 44 is heated (FIG. 7C).

Figure 7D:
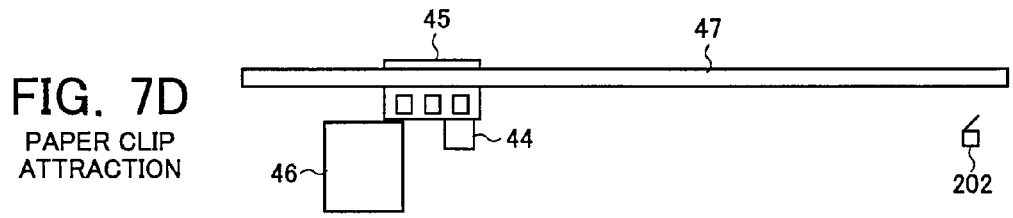
Figure 7E:
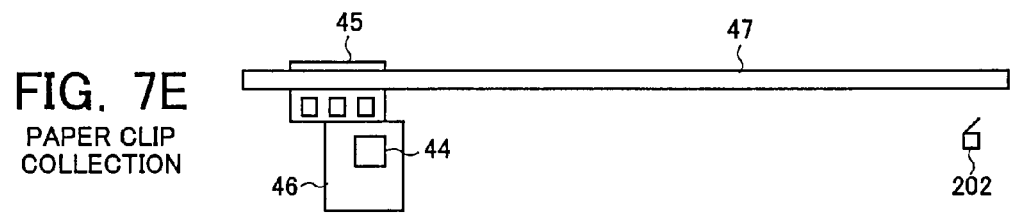

After the paper clip 44 is heated for a predetermined time, the electric power supply to the heating device 204 is cut off and the paper clip removing device 45 is moved by a predetermined distance (a distance between the heating device 204 and the attracting device 206) so that the attracting device 206 is energized and the paper clip 44 is attracted (FIG. 7D).

Figure 7F:
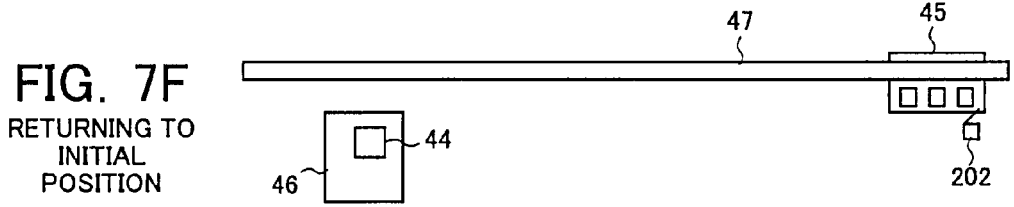

Then, the paper clip 44 is moved to a collecting box 46, the electric power supply to the attracting device 206 is cut off to collect the paper clip 44 in the collecting box 46 (FIG. 7E), followed by returning the paper clip removing device 45 to the home position (FIG. 7F). After that, a document transport processing is started.

Figure 8:
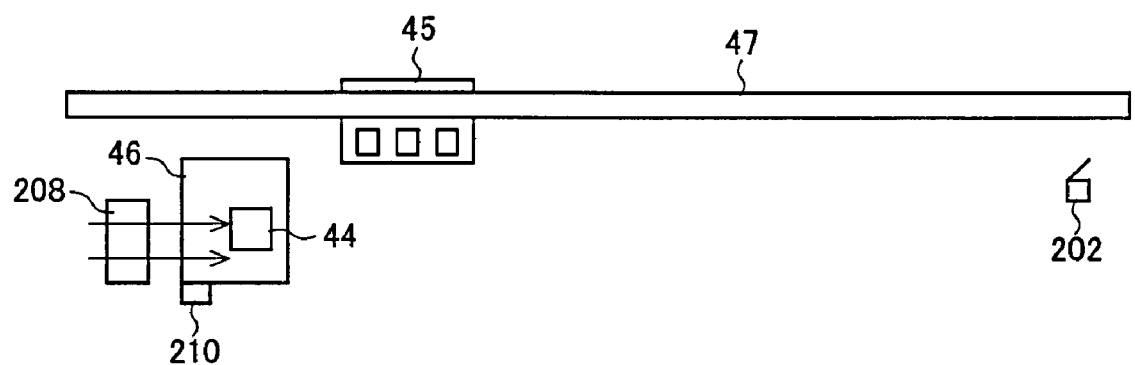
FIG. 8 is a diagram for showing the vicinity of a collecting box in detail.

FIG. 8 is a diagram for showing the vicinity of the collecting box 46 in detail. In this figure, the cooling device 208 composed of a cooling fan is arranged close to the collecting box 46, and cools down the paper clip 44 heated by the heating device 204.

The cooling device 208 is communicated with the outside of the device to introduce outside air to the collecting box 46. In addition, the temperature detecting device 210 composed of a temperature sensor contacts the collecting box 46 and detects the temperature therein to detect the temperature of the paper clip 44 indirectly.

Here, it is preferable that a metal with high thermal conductivity is used for the collecting box 46, and that the operation-display portion 130 displays an attention to be careful not to touch the collecting box 46 when its temperature is above the predetermined value.

Figure 9:
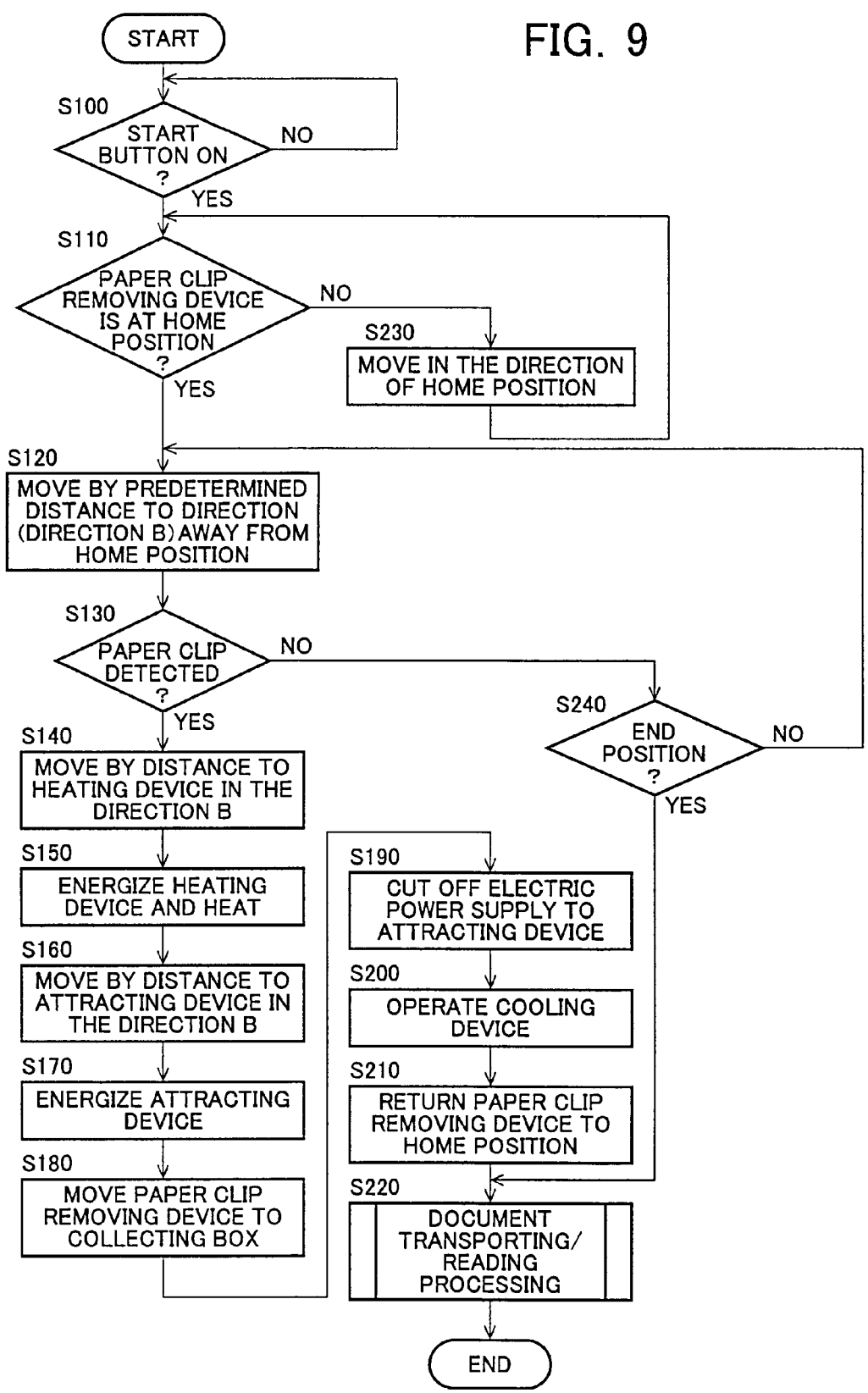
FIG. 9 is a flowchart for showing a flow of processing of a movement control by the paper clip removing device.

FIG. 9 is a flowchart for showing a flow of a processing of a movement control by the paper clip removing device 45.

When a document is placed and a start button for instructing a start of reading is turned on (step S100), the home position sensor 202 detects if the paper clip removing device 45 is located at the home position, and in a case where the paper clip removing device 45 is not at the home position (step S110/NO), the paper clip removing device 45 continuously moves to a direction closer to the home position (direction A) until the paper clip removing device 45 is detected by the home position sensor 202 (step S220).

On the other hand, when the paper clip removing device 45 is located at the home position (step S110/YES), the paper clip removing device 45 is moved to a direction away from the home position (direction B) by a predetermined distance (about 5 mm) (step S120).

Further, when the paper clip removing device 45 is moved to an end position (limit position of the movement) (step S240/YES) without detecting the paper clip 44 by the paper clip detecting device 203 (step S130/NO), it is determined that there is no paper clip, followed by moving to a document transporting/reading processing (step S220). The arrival to the end position is determined by judging whether or not the movement amount from the initial position has reached to the predetermined amount.

On the other hand, when the paper clip 44 is detected by the paper clip detecting device 203 (step S130/YES), the paper clip removing device 45 is moved by a distance from the paper clip detecting device 203 to the heating device 204 to the direction away from the home position (direction B) (step S140).

After the paper clip removing device 45 is moved to the heating device 204, the heating device 204 is energized to heat the paper clip 44 (step S150).

After the heating device 204 is heated for a predetermined time, the electric power supply to the heating device 204 is cut off, and the paper clip removing device 45 is moved by a distance to the attracting device 206 in the direction away from the home position (direction B) (step S160).

Then, the attracting device 206 is energized to attract the attracting portion of the paper clip 44 by a magnetic force (step S170) and the paper clip removing device 45 is moved to the collecting box 46 (step S180), followed by cutting off the electric power supply to the attracting device 206 to drop and collect the paper clip 44 in the collecting box 46 (step S190).

After that, an operation of the cooling device 208 is started, however, the cooling device 208 is caused to stop the operation after cooling down for a fixed time (step S200).

Subsequently, the paper clip removing device 45 is returned to the home position (step S210).

As a result, the document is released from a state being bound by the paper clip so that the document can be transported, thus the document transporting/reading processing is started (step S220).

The paper clip can be easily detected, removed, and collected, even if the paper clip is applied in any positions on one side of the document in the embodiments described above.

In addition, when the paper clip removing device is applied to the document reading apparatus, the document that is bound by the paper clip is released from the bound state easily so that the document can be transported, resulting that it is possible to eliminate the troublesomeness of removing the paper clip.

According to the invention, a paper clip can be easily detected, removed and collected even if the paper clip is fitted on any positions on one side of a document. Further, when a paper clip removing device is applied to a document reading apparatus, a document bound by a paper clip is easily released from a bound state to a transportable state, thus it is possible to eliminate the troublesomeness of removing the paper clip.

The invention claimed is:

1. A paper clip removing device that removes a paper clip made of a shape memory alloy, that has such a shape that a plurality of documents are bound at a normal temperature and a document bundle is released in a heated state, the paper clip removing device comprising:
   a detecting device that detects a position of the paper clip;
   a heating device that heats the paper clip;
   an attracting device that attracts the paper clip by a magnetic force;
   a moving device that moves the detecting device, the heating device, and the attracting device; and
   a controlling device that controls an operation of the moving device, wherein
   the controlling device controls the moving device so that the paper clip is heated based on the information of the position of the paper clip detected by the detecting device and the paper clip that is deformed to a shape of releasing a document bundle is removed by being attracted by the attracting device, and the paper clip removing device includes a collecting box in which the paper clip is collected, and a cooling device that cools down the paper clip collected in the collecting box.

2. The paper clip removing device as defined in claim 1, wherein the detecting device, the heating device and the attracting device are constituted integrally as a paper clip removing device, and the moving device moves the paper clip removing device.

3. The paper clip removing device as defined in claim 1, wherein the paper clip includes a binding portion made of a shape memory alloy and an attracting portion made of a magnetic substance.

4. The paper clip removing device as defined in claim 1, wherein the paper clip removing device includes a temperature detecting device that detects a temperature in the collecting box, and the controlling device performs a notification depending on the temperature in the collecting box.

5. A document reading apparatus including the paper clip removing device as defined in claim 1.

6. The document reading apparatus as defined in claim 5, wherein the document reading apparatus includes a controlling device that performs the control so that whether the paper clip is present on a leading end of a document placed on a document stacker is detected when an instruction to start a document reading is made and the paper clip is removed by the paper clip removing device, then a document transport is started after the document is made in a state of being unbound.

* * * * *